United States Patent

[11] 3,608,015

| | | |
|---|---|---|
| [72] | Inventor | Nerio Martelli<br>Bologna, Italy |
| [21] | Appl. No. | 840,862 |
| [22] | Filed | Mar. 21, 1969 |
| [23] | | Division of Ser. No. 510,788, Dec. 1, 1965,<br>Pat. No. 3,473,197 |
| [45] | Patented | Sept. 21, 1971 |
| [73] | Assignee | Ethyl Development Corporation |
| [32] | Priority | Dec. 7, 1964 |
| [33] | | Belgium |
| [31] | | 656,716 |

[54] PROCESS FOR THE PRODUCTION OF PLASTIC OF HOLLOW BODIES
2 Claims, 20 Drawing Figs.

[52] U.S. Cl. .................................................. 264/89,
264/90, 264/99, 264/154
[51] Int. Cl. ........................................... B29c 17/07,
B29c 23/00
[50] Field of Search.......................................... 264/88, 89,
90, 92, 99, 154–156; 18/5 BE, 5 BP, 5 BN, 19 F

[56] References Cited
UNITED STATES PATENTS
| | | | |
|---|---|---|---|
| 2,790,994 | 5/1957 | Cardot et al. .................. | 264/90 |
| 3,310,620 | 3/1967 | Martelli et al. ............... | 264/90 |

*Primary Examiner*—Robert F. White
*Assistant Examiner*—J. H. Silbaugh
*Attorney*—Donald L. Johnson ABSTRACT: A process for the continuous production of hollow bodies from a softened tube of plastic material. A softened tube of plastic material is continuously extruded through the head of an extrusion machine and a part of successive sections of the tube is enclosed in a series of adjacent molds. The molds are moving at a spaced slightly greatly than the speed of extrusion and the remaining portion of each tube section is stretched while it lies between the extrusion head and one of the molds. The stretched portion of the tube is perforated for venting and the stretching causes elongation of the perforation which facilitates the venting. Suction is sequentially applied to each mold cavity to shape the enclosed tube portions against the molds and a cooling medium is circulated through the molds to cool the shaped tube sections.

PATENTED SEP 21 1971 3,608,015

PROCESS FOR THE PRODUCTION OF PLASTIC OF HOLLOW BODIES

This application is a division of application Ser. No. 510,788, filed Dec. 1, 1965, for "Apparatus for the Production of Plastic Hollow Bodies," now U.S. Pat. No. 3,473,192.

This invention concerns a process for the production on a continuous basis of hollow bodies from plastic by suction molding, as well as apparatus and a type of mold particularly suited to implementing same.

There have been previous proposals to make hollow bodies, for instance, bottles by blow-molding. In these processes, a tubular parison of softened plastic is enclosed in a two-part mold ad blown by means of a blowing head inserted in a blowhole located on the upper or lower portion of the mold. The presence of this blowing head, however, presents a number of problems in the producing of continuous-type molding machines, especially in the case of rotary machines. Thus, it is necessary to provide mechanical or other means to move these blowing heads aside when the molds pass under the extrusion head which is ejecting the tubular parison to be blown, so as to prevent any undesirable collision. In addition, the necessity of providing free space to position these heads prevents the utilization of contiguous molds; accordingly, since the tubular parison to be blown is extruded on a continuous basis, the tubular portions between the molds constitute an undesirable loss of material. This loss, which is already relatively large in the manufacture of large-size containers by such processes, becomes completely prohibitive when one wishes to produce containers of small capacity, that is, less than 250 cm.$^3$. It seems, therefore, that present techniques for blow-molding cannot offer an economical solution to the problem of continuous production of small-size hollow bodies from plastic.

It has also been proposed that plastic hollow bodies be produced by techniques involving vacuum molding. In these processes, the portion of tube to be expanded is enclosed in a mold, then the air surrounding this tubular portion in the mold is exhausted, so that its wall comes to rest against those of the mold. However, these techniques also present certain disadvantages. Thus, the need to provide exhaust vents on the internal wall of the molds clearly increases the cost price of these molds and, therefore, the cost price of the complete apparatus. Moreover, the presence of these vents presents problems in refrigerating the molds. Finally, the application of these techniques in rotary equipment for the continuous production of hollow bodies form plastic presents certain difficulties Thus, for example, one annoying obstacle in applying these techniques to this type of equipment arises from the fact that the softened tube put out by the extruder is still in contact with the latter during the forming of the portion of tube enclosed in the mold. As a matter of fact, when the latter portion is expanded, the depression created within the latter causes the flattening of the freshly extruded tube portion located between the extrusion head and the mold. The walls of this portion, accordingly, threaten to be welded together, which entails difficulties during molding of the following hollow body.

Nevertheless, since these techniques do not require a separation between the molds to permit positioning of blowing heads, a process and equipment permitting them to be applied in the continuous production of plastic containers would seem to be of particular interest, if the disadvantages indicated above can be avoided.

The applicant has perfected such a process, as well as equipment and a new type of mold to implement it.

In carrying out the process of the present invention for the continuous production of hollow bodies from a tube of plastic material the tube of plastic material is continuously extruded through the head of an extruding machine. At least a part of the successive sections of the tube are enclosed in a series of continuous molds. Suction is applied sequentially to the cavity of the molds to shape the enclosed portions of the tube sections to the interior of the molds. The sections of the tubing are vented to atmospheric pressure.

The applicant has discovered, moreover, that in order to secure a good suction in the molds, and therefore, a good formation, it is not absolutely necessary to distribute exhaust vents over the entire surface of the molds. In fact, it is enough to provide an exhaust channel all around the periphery of the mold stamp, communicating with the interior of the latter by means of a narrow slit, to obtain proper forming of the tubular portions of plastic material enclosed in the molds. For reasons of ease of operation, this peripheral channel can, at choice, be situated in the mold-closing plane. This process of creating a vacuum in the molds makes it possible to simplify to the greatest extent possible the manufacture and machining of the molds, and thereby to lower their cost considerably. Moreover, it has the advantage of permitting vigorous cooling of the molds by circulating a suitable liquid under the shell of the molds and in direct contact with same, since there is no longer any exhaust vent involved.

Each successive portion of tube between the extrusion head and each successive mold passing beneath the head is put into contact with the atmosphere by perforating this tubular section before forming the portion enclosed in the mold. This perforating is done as close as possible to the molds so as to limit waste to a minimum, and can be done, for instance, by means of a knife or stationary punch mounted on the mold in such a way as to perforate the extruded tube between he extrusion head and the mold when the latter is closed. Connecting this tubular portion to the atmosphere can be done even more effectively by regulating the speed of displacement of the molds so that it is slightly greater than the speed of extrusion of the tube of softened plastic. When this is done, the portion of tube between each successive mold and the extrusion head is slightly drawn out, which means, as a consequence, that the perforation made in this portion becomes oval shaped, which facilitates the intake of air. Moreover, the creating of equilibrium between the interior of each tubular segment and the atmosphere can be facilitated by using an extruder with a hollow drawplate core, and by injecting through this core into the extruded tube, slightly overpressurized air.

According to another possible variation, the tubular portion can be put into contact with the atmosphere by means of a conduit passing through the core of the extrusion head drawplate and opening in the air. In this variation, it is not necessary to make any perforation in the parison, and the molds can be practically contiguous, since it is no longer necessary to provide any free space so as to position the tools needed to accomplish such perforation.

The creation of a vacuum in the molds is effected by exhausting the air trapped in them after they close on the portion of tube to be shaped. This suction is accomplished by means of a channel surrounding their shell, preferably in the mold-closing plane, and by connecting this channel with a vacuum source. The edge of this channel located on the shell side is slightly lower than the edge of the other side, so that, when the mold is closed, this peripheral channel is in contact with the operating part of the mold by means of a narrow slit which surrounds the latter, while the other edge of the channel provides for airtight closing of the mold.

The invention also deals with rotary equipment developed by the applicant which is especially suited for the production of hollow bodies by applying the above-mentioned process.

This equipment, which is described below, in no way limits the scope of the invention, however, because, on the one hand, it can have numerous variations which are included within its framework and its spirit, and, on the other hand, the process according to the invention can obviously be used on machines of a type other than the one that will be described. Thus, for example, this process can be applied to molding machines which function on an alternating linear basis.

One form of the apparatus developed by the applicant is illustrated in the figures in the annexed drawings in which.

Figure 2:
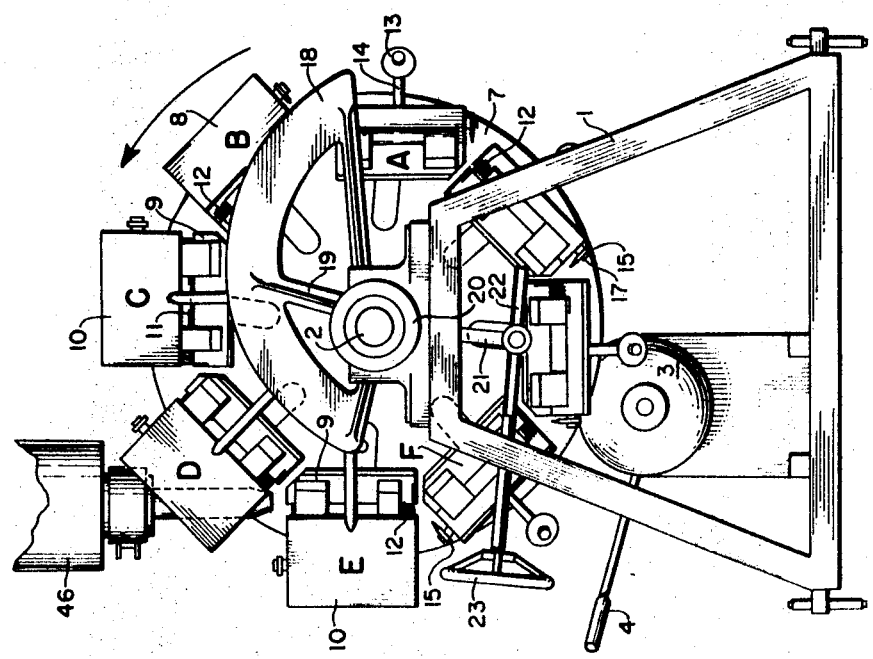
FIG. 2 is a side view of the apparatus of FIG. 1.
Figure 1:
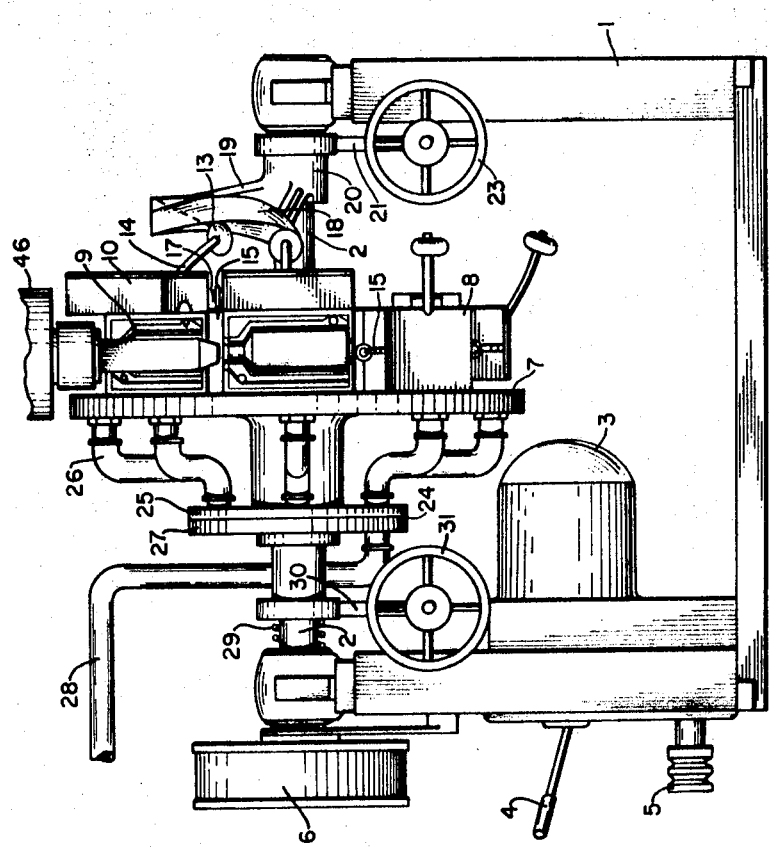
FIG. 1 is a front elevation view of vacuum-molding apparatus constructed in accordance with the invention.
Figure 3:
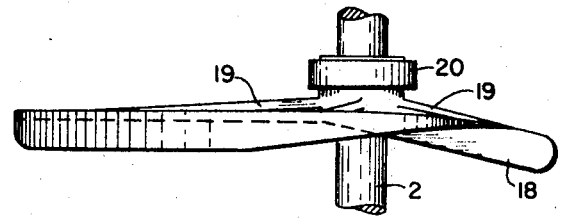
FIG. 3 is a front view of the mold-opening cam.
Figure 3B:
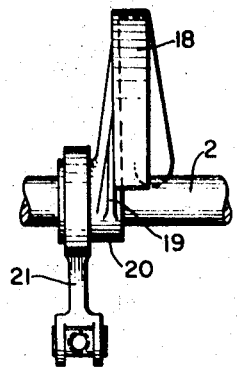
FIG. 3b is a top view of FIG. 3.
Figure 3A:
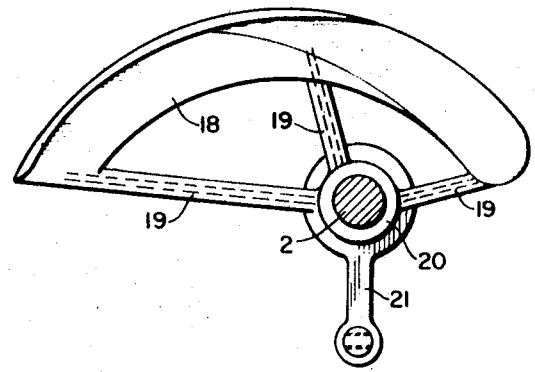
FIG. 3a is a side view of FIG. 3.
Figure 4:
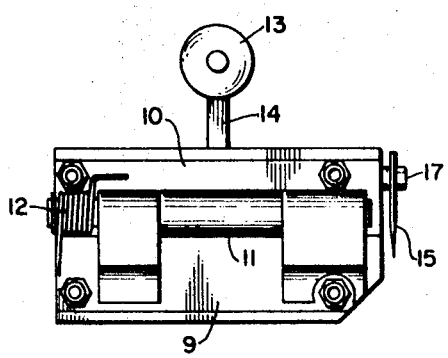
FIG. 4 is an elevation view of a closed mold.
Figure 5:
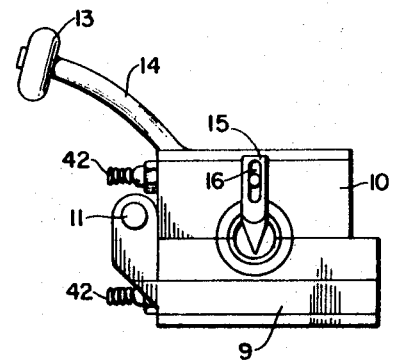
FIG. 5 is a top view of the mold in FIG. 4.
Figure 6:
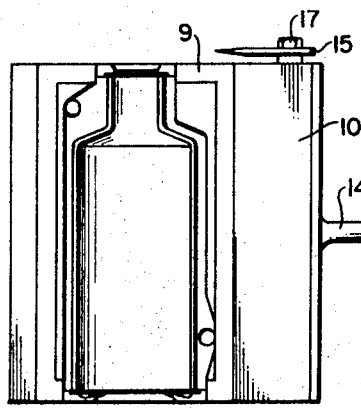
FIG. 6 is an elevation view of an open mold.
Figure 7:
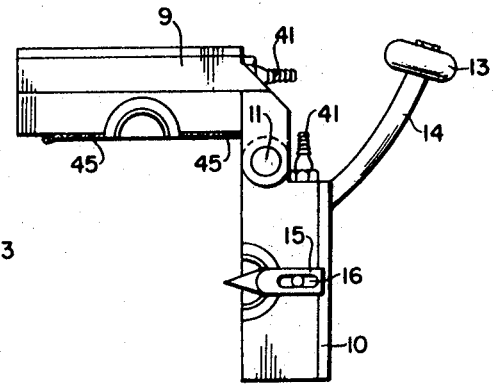
FIG. 7 is a top view of the mold in FIG. 6.
Figure 17:
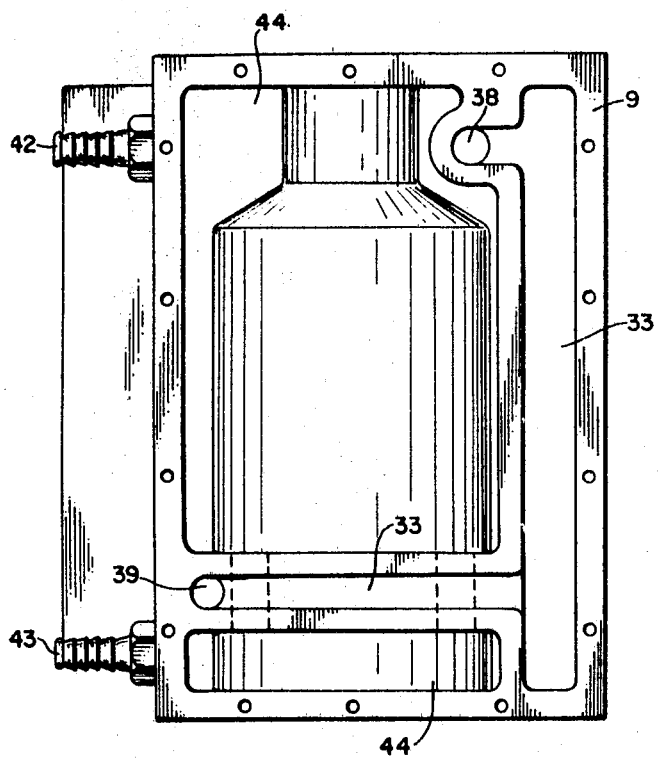
Figure 18:
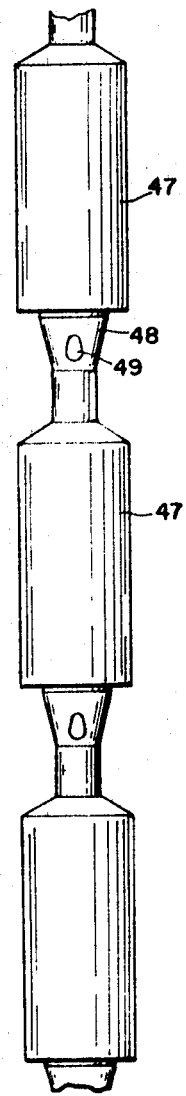

FIG. 17 is a rear view of a stationary half-mold whose cover has been removed, and FIG. 18 is an elevational view of a series of hollow bodies produced by the apparatus. Referring to FIGS. 1 and 2, the rotary equipment according to the invention consists of a structure 1, on which is mounted in a movable manner a horizontal shaft 2 activated by the motor 3 by means of a speed shift controlled by lever 4, and a transmission, not shown, connecting pulleys 5 and 6. On shaft 2 is mounted a support plate 7 on which is attached a series of practically contiguous molds 8. Each mold 8 consists of two half-molds one of which 9, is fixed in a stationary manner onto support plate 7. The other half-mold 10, as shown in FIGS. 4, 5, 6 and 7, is movable, and is attached by a hinge 11 onto the stationary half-mold 9 so as to form a mold which opens and shuts like a book. This hinge is equipped with a spring 12 which tends to keep the mold closed. Teach movable half-mold 10 is also equipped with a loose roller 13 mounted on an arm 14. Finally, a knife 15 is mounted on the upper side of the movable half-molds; the position of this knife can be adjusted by means of groove 16 and by means of a setscrew 17 or any other equivalent means. Shaft 2 also holds a cam 18, detailed in FIG. 3, attached by means of supports 19 connected to a sleeve 20, mounted loosely on shaft 2. This sleeve includes an arm 21, through the end of which is screwed an adjusting pin 22 provided with a guide wheel 23. Adjusting pin 22 can, by rotation, slide axially in a bushing mounted on the structure 1 of the machine. By turning the adjusting pin 22 by means of guide wheel 23, therefore, one can vary the angular position of arm 21 and therefore, that of cam 18. The functioning mechanism of cam 18, working together with the loose rollers 13 of the movable half-molds 10 will be described later.

The equipment is also provided, as shown in FIG. 1, with a vacuum-distributing device which creates a vacuum in the molds at the proper moment. Such distributors are known, and, accordingly, their internal design does not come within the scope of this description. Distributing device 24 mounted on the present equipment consists of two distribution plates, one of which, 25, is part of support plate 7 and connected to the various stationary half-molds 9 by means of tubing 26. The second stationary plate 27 is mounted loose onto shaft 2 and connected to a vacuum source, not shown, by tubing 28. The two plates 25 and 27 are maintained one against the other by the action of a spring 29 threaded onto shaft 2 and resting on the housing 1 of the equipment. Loose plate 27 is equipped with an arm 30 which, by means of guide wheel 31, makes it possible to vary its angular position, through a mechanism similar to that previously described for the adjusting of cam 18.

Figure 8:
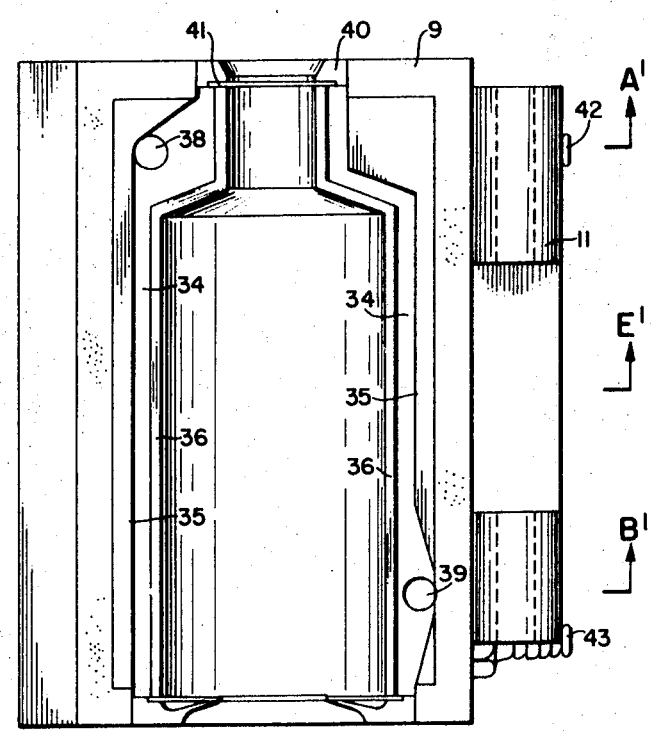
FIGS. 8 and 9 are elevation and top views, respectively, of a stationary half-mold.
Figure 9:
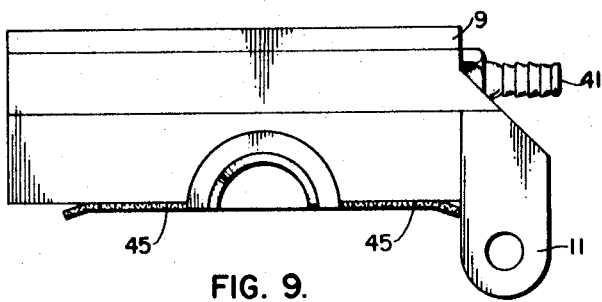
Figure 10:
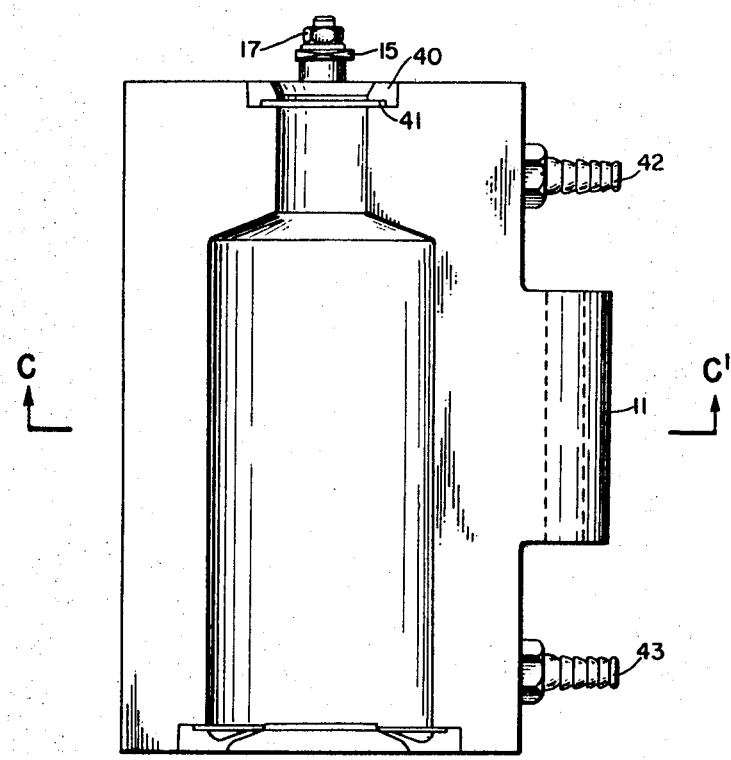
FIGS. 10 and 11 are elevation and top views, respectively, of a moving half-mold.
Figure 11:
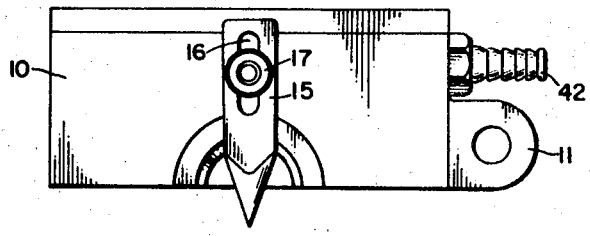
Figure 12:
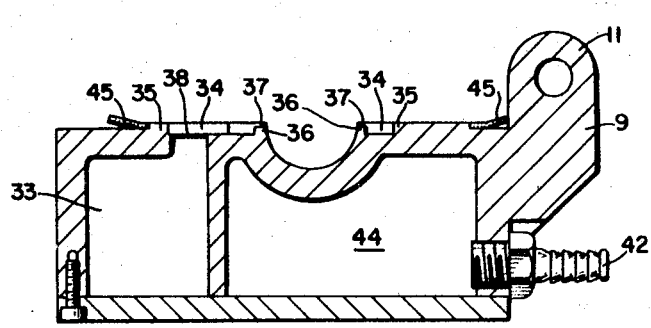
FIG. 12 is a view on line A A$^1$ of FIG. 8.
Figure 13:
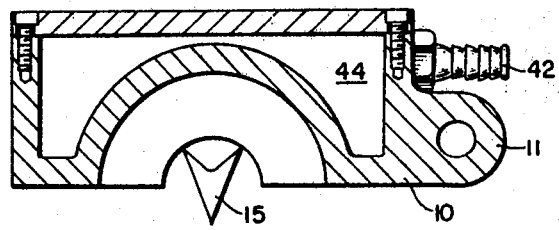
FIG. 13 is a view on line C C$^1$ of FIG. 10.
Figure 14:
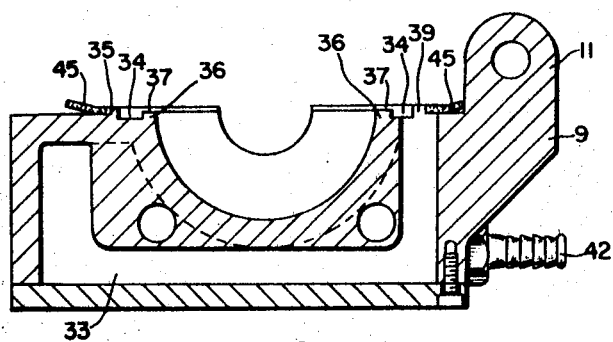
FIG. 14 is a view on line B B$^1$ of FIG. 8.
Figure 15:
FIG. 15 is a detail view of item 40 as seen in FIG. 8.
Figure 16:
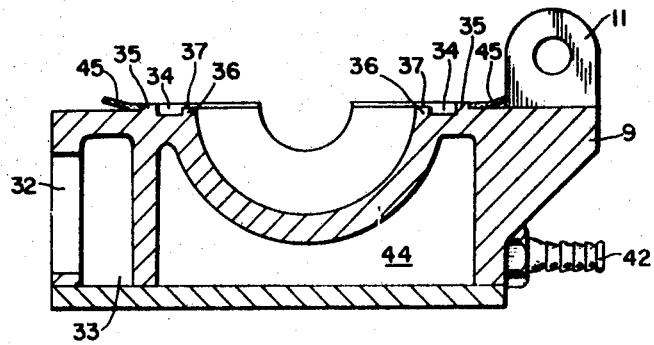
FIG. 16 is a view on line E E$^1$ of FIG. 8.

Before explaining in detail the functioning of the equipment, it is well to describe more completely the makeup of the molds mounted on same, and, in particular, to set down in detail the original vacuum-creating circuit with which they are equipped. For this purpose, reference will be made more particularly to FIGS. 8, 10, 12, 14, 15, 16 and 17. Each tubing 26 connects, through support plate 7, distributor 24 to a stationary half-mold 9 by means of the opening 32 provided in the wall of the latter which adjoins the support plate (FIG. 10). This opening leads into a vacuum chamber 33 provided under the shell of the stationary half-mold. In considering FIG. 8, one notes that the shell of the stationary half-mold is surrounded, in its closing plane, by a small peripheral channel 34 delimited by two flanges 35 and 36. Flange 36, located on the working part side of the half-mold, is slightly lower than the outside flange 35, so that when the movable half-mold is applied against the stationary half-mold, peripheral channel 34 communicates by means of a slit 37 with the interior of the mold, while outside flange 35 provides airtight closing of the mold. To get a better grasp of this detail, all that is needed is to mentally apply FIG. 13, or more precisely FIG. 16, against FIG. 14. This peripheral channel 34, located in the mold-closing plane, is in turn in communication with vacuum chamber 33 by means of apertures 38 and 39, diametrically opposed with respect to the mold shell. The continuity of peripheral channel 34 in the area of the neck of the mold is provided by a connecting piece 40 (FIG. 15) which forms a peripheral channel 41 surrounding this area. Then, after a mold closes on a section of softened tube and after the latter is put in contact with the source of vacuum by means of its tubing 26 and the distributor 24, the air trapped in the mold is exhausted through peripheral slit 37 into channel 34 and evacuated through apertures 38 and 39 to the vacuum chamber 33. This system of creating a vacuum in the mold, which has been found to be especially effective, has the advantage, in addition to lowering the cost, of leaving the surface of the shells of each half-mold completely free, which permits very vigorous cooling of the molds and, therefore, increased productivity. This refrigeration can be secured, for instance, by cold water entering and leaving through tubings 42 and 43 which can cool the entire rear portion of the shells by filling the chambers listed 44 as appears in FIGS. 12, 13, 16 and 17.

Sealing of the molds when they are placed under vacuum is, moreover, provided for by an airtight fitting 45 attached in the closing plane of the molds.

Functioning of the equipment described above is as follows, assuming that it is in working condition and that all necessary adjustments have been made. For this description, reference will be made to FIG. 2, the moving part of the equipment turning in the direction indicated by the arrow, that is counterclockwise, and the successive positions occupied by any particular mold are indicated by letters A, B, C, D, E, and F.

When a mold is in position A, it is closed. As soon as it leaves this position, its roller, or cam follower, 13 engages on cam 18, whose profile has been designed in such a way as to cause it to open gradually under the action of its spring 12, through pivoting of movable half-mold 8 around the latter 11. This gradual opening is clearly shown in FIG. 2, at the positions marked B, C, and D, the mold being completely open when it occupies the last-named position. When the mold occupies position E, it receives a section of soft plastic tube put out by extruder 46. The drawplate of this extruder can be advantageously extended as shown in FIG. 2, so as to obtain a perfect centering of the tubular portion deposited in the stationary half-mold. As soon as the mold leaves position E, its roller 13 is actually freed from cam 18. At this moment, spring 12 causes the movable half-mold 10 to press down on the stationary half-mold, and thereby, to close the mold onto said tubular segment. In this pressing movement, the knife 15 located on the upper part of the movable half-mold perforates the portion of plastic tube emerging from the mold and puts it in direct contact with the atmosphere. If it is deemed necessary, it is possible as has been stated above, to regulate the speed of rotation of support plate 7 in such a way that the tangential speed of the molds is slightly greater than the speed of extrusion of the plastic tube, so that this tubular portion is slightly drawn out and the perforation by the knife 15 tends to become oval shaped and thus permit easier entry of air. In addition, the core of extruder 46 can be hollow, and it is possible to inject through the core a slight air overpressure with respect to the atmosphere, into the extruded tube, in order to balance the internal pressure of the latter more rapidly. As soon as the mold is completely closed, that is, when it occupies position F, for instance, the vacuum distributor 24 connects the interior of the mold with a source of vacuum and the tube segment enclosed in the mold is shaped. The increase in volume of this segment when it is shaped, causes a vacuum effect inside it, but this effect cannot lead to the collapse of the external part of the extruded tube, since it is directly compensated by the reentry of air caused by the perforation by the knife 15, and perhaps by the slight overpressure injected by the hollow core of the extruder.

The closing spring 12 of the molds does not necessarily have to be very powerful. All that is required is that it should be sufficiently strong to close the mold without pressure in position E, as the airtight closing of the mold during the molding operation is assured by the vacuum which exists at that moment inside the mold, and not by the spring. Sealing of the closed mold is provided for by the fitting 45 attached to the edge of the stationary half-mold. However, the seal may be improved further by leaving the outside edge of this fitting free.

Between positions F and A the molded hollow body is cooled by the mold-refrigerating water. Since this cooling is very vigorous, the speed of rotation of support 7, and, accordingly, the productivity of the equipment, can be very high. When the mold goes beyond position A, its roller 13 again causes it to open gradually, and after removal of the hollow body, it can begin a new working cycle. The equipment described thus supplies, as shown in FIG. 18, a continuous chain of containers 47 joined together by a small waste 48 including the perforation 49 made by knife 15 which connects it to the atmosphere. This waste is equal to the distance separating two successive molds, and therefore, since the molds can be nearly connected, taking into account the free space needed for the movement of the knife 15, the proportion of wastes can be reduced to a minimum. This capability for reducing waste is particularly important in the production of small-size containers. The hollow bodies are subsequently separated from one another by sectioning the piece of tube 48 by any means now known.

When the equipment is put into operation, it is a good idea to adjust:

the extrusion speed of the softened plastic tube by means of some known adjustment of the extruder, the speed of rotation of the support plate by acting on the variator of the drive motor 3, the closing time of the molds by acting on cam 18 by means of drive wheel 23, the moment of vacuum creation in the molds by acting on the vacuum distributor 24 by means of guide wheel 31, the position of the knives 15 by acting on the screws, 17.

It is clear that the invention which has just been described and illustrated, can be the object of numerous variations which in no way are outside its scope or its spirit, to the extent that the process, or else the original mechanical details, that have been set forth here, are exploited.

What is claimed is:

1. In a process for the continuous production of hollow bodies from a softened tube of plastic material comprising:
    a. continuously extruding through the head of an extruding machine a softened tube of plastic material;
    b. enclosing a part of successive sections of said tube in a series of adjacent molds, said molds moving in the direction of extrusion at a speed slightly greater than the speed of extrusion of said tube and thereby stretching that remaining portion of each tube section lying initially between each successive mold and said head of said extruding machine;
    c. perforating said remaining portion of each tube section to vent each tube section to the atmosphere, said stretching of each said remaining portion causing elongation of the perforation to facilitate venting;
    d. applying suction sequentially to the cavity of said molds to shape the enclosed portions of said tube sections to the interior of said molds; and
    e. cooling said shaped enclosed tube sections by circulating a cooling medium through said molds.

2. The process of claim 1 wherein the pressure inside each shaped tube section is raised to slightly above atmospheric pressure.

PO-1050
(5/69)

UNITED STATES PATENT OFFICE
CERTIFICATE OF CORRECTION

Patent No. 3,608,015                Dated September 21, 1971

Inventor(s)  Nerio Martelli

It is certified that error appears in the above-identified patent and that said Letters Patent are hereby corrected as shown below:

In the heading, No. 23 reads "Pat. No. 3,473,197", should read -- Pat. No. 3,473,192 --; No. 54 reads "Process for the Production of Plastic of Hollow Bodies", should read -- Process for the Production of Plastic Hollow Bodies --. In the Abstract, line 6 reads "at a spaced slightly greatly", should read -- at a speed slightly greater --. Column 1, the title reads "Process for the Production of Plastic of Hollow Bodies", should read -- Process for the Production of Plastic Hollow Bodies --. Column 1, line 13, reads "ad blown", should read -- and blown --. Column 1, line 47, reads "bodies form", should read -- bodies from --. Column 1, line 48, the period (.) is omitted after "difficulties". Column 3, line 32, reads "Teach movable", should read -- Each movable --. Column 3, line 74, reads "(FIG. 10)", should read -- (FIG. 16) --. Column 4, line 58, reads "is actually freed", should read -- is suddenly freed --.

Signed and sealed this 21st day of March 1972.

(SEAL)
Attest:

EDWARD M. FLETCHER, JR.          ROBERT GOTTSCHALK
Attesting Officer                Commissioner of Patents